United States Patent [19]

Otsuka et al.

[11] Patent Number: 5,527,746
[45] Date of Patent: Jun. 18, 1996

[54] METHOD FOR MANUFACTURING AN ALUMINUM OXIDE SINTERED BODY

[75] Inventors: Jun Otsuka; Satoshi Iio; Yo Tajima, all of Aichi, Japan

[73] Assignee: NGK Spark Plug Co., Ltd., Nagoya, Japan

[21] Appl. No.: 417,027

[22] Filed: Apr. 5, 1995

Related U.S. Application Data

[62] Division of Ser. No. 311,580, Sep. 23, 1994.

[30] Foreign Application Priority Data

Sep. 24, 1993 [JP] Japan .................................. 5-621921

[51] Int. Cl.⁶ ........................ C04B 35/117; C04B 35/577

[52] U.S. Cl. ........................ 501/89; 501/91; 501/92; 501/127

[58] Field of Search ........................ 501/89, 91, 92, 501/127; 264/65, 66

*Primary Examiner*—Karl Group
*Attorney, Agent, or Firm*—Sughrue, Mion, Zinn, Macpeak & Seas

[57] ABSTRACT

An aluminum oxide based sintered body and a method for manufacturing the same are disclosed. The aluminum oxide based sintered body is composed of silicon compounds of from about 5 to about 40 mole %, calculated as a carbide, at least one metal or metal compound of from 0.5 to about 25 mole %, calculated as metals, selected from Ti, Nb, Ta, Cr and Mo, and the remainder of $Al_2O_3$, and a molar ratio of the metals with respect to the silicon compounds, calculated as a carbide is about 4 or less.

2 Claims, No Drawings

METHOD FOR MANUFACTURING AN ALUMINUM OXIDE SINTERED BODY

This is a divisional of application Ser. No. 08/311,580 filed Sep. 23, 1994.

FIELD OF THE INVENTION

The present invention relates to an aluminum oxide based sintered body and a method for manufacturing the same. The alminum oxide sintered body is suitably used for a material required having wear resisting properties, such as various materials for use in mechanical tools, sliding parts etc.

BACKGROUND OF THE INVENTION

It is well known in the arts that aluminum oxide ceramics may be prepared in relatively low cost and have excellent properties, particularly, in terms of mechanical strength and heat resistance. Accordingly, aluminum oxide has been widely used for in various applications.

As one of the practical applications of the aluminum oxide for mechanical purposes, a part in a machine required having highly wear resistance, for example, materials for tools, sliding parts, etc has been sintered. However, since the requirements on these application becomes severe, the material capable of attaining higher performance are further demanded. In particular, the materials having high wear resistance are desired.

To be comply with such requirements, an attempt is made to improve in wear resistance by adding various carbides into the aluminum oxide.

The material made of aluminum oxide in which various carbides are simply added, generally shows large crystal grains, and does not satisfy the severe requirement since the dislodgement of the grains from the sintered material are liably caused when it is subjected to abrasion. These materials cannot be accepted as having sufficient wear resistance.

The aluminum oxide containing carbides has drawbacks that if the carbide is in an amount of less than 5 wt % shows insufficient wear resistance, and on the other hand, the more the amount of carbides is, the lesser the mechanical strength depending on the carbides becomes.

The reason for the above phenomenon is not clear so far, however, it is considered to be depending on the fact that interfacial bonding between the aluminum oxide grains and various carbides grains is so weak and the aluminum oxide grains are not sufficiently pulverized.

For instances, JP-A-62-59567 (a term "JP-A" used herein means unexamined Japanese patent publication) discloses a ceramic material having excellent were resistance which principally comprises 5 to 20 weight % of titanium carbide and the rest of alumina. Since the titanium carbide, per se. is added as one of the starting materials, the effect according to the present invention in terms of the wear resistance cannot be attained.

JP-A-52-104515 and JP-A-63-129061 are disclosed to prepare alumina/titanium carbide ceramic material, in which titanium carbide is formed by chemical reaction in a firing step, however, no third component, which is required as an indispensable component to fulfill the objects according to the present invention, is present in the composition. Accordingly, the product obtained by the chemical reaction step is these references cannot form pulverized grain of the present invention.

According to the present invention in which these drawbacks are overcome, there is to provide an aluminum oxide based sintered body having excellent properties in terms of mechanical strength and wear resistance, as well as a method for producing the same.

SUMMARY OF THE INVENTION

A first object of the present invention is attained by providing the aluminum oxide based sintered body which comprises from about 5 to about 40 mole % of silicon, calculated as a carbide, from about 0.5 to about 25 mole % of at least one metal or metal compound, selected from Ti, Ta, Cr and Mo, calculated as metals, and the remainder of $Al_2O_3$, and a molar ratio of the metals with respect to the silicon compounds, calculated as a carbide, is about 4 or less.

A second object of the present invention is attained by providing the aluminum oxide based sintered body which comprises from about 5 to about 40 mole % of silicon, calculated as a carbide, from about 0.5 to about 25 mole % of at least one metal or metal oxide selected from Ti, Nb, Ta, Cr and Mo, calculated as metals and the remainder of $Al_2O_3$, a molar ratio of the metals with respect to the silicon compounds, calculated as a carbide, is about 4 or less, and the carbides or silicides of said metals having an average particle size of about 1 μm or less are dispersed.

A preferable method for producing the aluminum oxide based sintered body comprises firing a powder mixture at a temperature of from about 1500° to about 1900° C. under a non-oxidizing atmosphere, wherein the powder mixture comprises from about 5 to about 40 mole % of silicon carbide, from about 0.5 to about 25 mole % of at least one metal selected from Ti, Nb, Ta, Cr and Mo and the remainder of $\alpha$-$Al_2O_3$ sources, calculated as $\alpha$-$Al_2O_3$, and the molar ratio of the metals with respect to the silicon carbide is about 4 or less to form and disperse carbides or silicides of said metals having an average particle size of about 1 μm or less therein.

In the method of the present invention for producing the sintered body, a treatment according to a hot isostatic press (hereinafter referred to simply as HIP) may be applied after a firing process.

The term of the molar ratio of the metals with respect to the silicon compounds, calculated as a carbide, used herein means a ratio of the mole of metals contained in the sintered body, such as Ti, Nb, etc., with respect to the mole of silicon contained also in the sintered body. In the case where the metal compounds are used, said mole % is calculated as metals.

DETAILED DESCRIPTION OF THE INVENTION

The $\alpha$-$Al_2O_3$ sources used in the present invention includes $\alpha$-$Al_2O_3$ and any raw material which is capable of being converted to $\alpha$-$Al_2O_3$ by firing thereof at a temperature of from about 1500° to about 1900° C. under a non-oxidizing atmosphere, for example, $\gamma$-$Al_2O_3$ or boehmite.

Mixing the powder mixture comprising silicon carbide, metals and $\alpha$-$Al_2O_3$ sources may be carried out in a conventional manner, such as in a wet-type ball-mill. The powder mixture, thus prepared, may be molded on demand, followed by firing thereof under a non-oxidized atmosphere, such as for example, under argon gas or nitrogen gas atmosphere. The firing process may be carried out according to a conventional method, i.e., either a pressurized firing or non-pressurized firing.

In the aluminum oxide based sintered body according to the present invention, the metals added were carbonized or silicified in firing process to form fine particles having an average particle size of about 1 μm or less. The metal carbides particles or metal silicides particles, thus formed, are dispersed in the sintered body, resulting in grain fineness due to suppressed grain growth of aluminum oxide. The fined aluminum oxide grains and metal carbides having wear resistance are synergistically affected to improve wear resistance of the sintered body. The metal silicides provide an improvement in wear resistance of the sintered body in the same extent, not much caused by the metal carbides. The metal carbides and the silicides can be selectively formed depending on a starting composition in wide range.

However, it is noted that not whole amount of the silicon carbide and metals are reacted with each other, and a silicon-containing glass sometimes may be by-produced or unreacted metals may be remained. The silicon-containing glass mentioned above is present along grain boundaries, and is preferable to enhance interfacial bonding strength between aluminum oxide and metal carbides particles or silicides particles due to intimate bonding therebetween. Thus, the silicon-containing glass is considered to become an effective ingredient according to the claimed invention.

On the other hand, unreacted metals show advantages to improve thermal conductivity without adversely affecting on the strength and wear resistance.

Accordingly, depending on a purpose, the raw material is not always reacted as a whole, but may partially remain in a non-reacted state. A ratio of the reacted and unreacted materials in product may be controlled according to a composition of the starting material and a firing temperature.

According to the method of the present invention, silicon carbide in a raw material is converted to bring a carbon source for metal carbides and a silicon source for metal silicides. Since in the silicon carbide, carbon atoms and silicon atoms are uniformly disposed at an atomic level, a product composition in which both carbides and silicides are formed contains metal carbides and metal silicides which are uniformly dispersed inherently.

Accordingly, metal carbides or metal silicides particles, which are finer than silicon carbide particles and metals particles, are formed during a firing process, thereby leading pulverization of aluminum oxide grains existed on grain boundaries or within grains in the sintered body. Thus, the sintered body having high strength and excellent wear resistance is obtained.

According to the present invention, since super fine particles are not required as a raw material, a production cost may be suppressed at a low level.

In the case where the silicon carbide is contained in an amount lower than about 5 mole %, an amount of the metals added is not higher than about 0.5 mole %, or a molar ratio of the metals with respect to the silicon carbide is over about 4, it is not preferable that a sufficient amount of metal carbides or metal silicides for enhancing wear resistance and strength are not formed.

On the other hand, when an amount of the silicon carbide to be added is over about 40 mole %, the sinterability may be deteriorated, and when an amount of the metal added is over about 25 mole %, segregation is liably caused and thereby bringing lowered wear resistance.

According to the present invention, aluminum oxide is pulverized by adding silicon carbide and specific metals into a starting material, and the excellent aluminum oxide based sintered body having 700 MPa or higher of mechanical strength and excellent wear resistance is economically obtained by incorporating a silicon containing glass along grain boundaries.

The present invention is hereinafter described in greater detail with reference to examples, which are not to be construed as limiting the scope thereof. Unless otherwise indicated, all parts, percents and ratios are by mole.

EXAMPLE 1

A powder mixture containing γ-$Al_2O_3$ which has 99% purity and an average particle size of 1 μm and contains small amounts of AlOOH and $Al(OH)_3$, SiC, which is of β-type and have an average particle size of 0.3 μm, Ti having through #400 mesh Standard Sieve, Cr, Nb and Ta having through #350 mesh Standard Sieve and Mo having an average particle size of 0.65 μm, and ethanol were charged into a wet-type ball mill in each amount stated in Table 1 below.

After mixing, the mixture was molded with a hot-press of 40 MPa pressure at a temperature mentioned in Table 1, to form Samples 1 to 25.

For comparison, Sample 26 was formed in the same method as of Sample 1 except that no metals and no silicon carbide were added.

TABLE 1

| Samples | Metal Added | Starting Composition (mol %) | | | Ratio Metal/SiC | Temperature (°C.) | Remarks |
|---|---|---|---|---|---|---|---|
| | | α-$Al_2O_3$ | SiC | Metal | | | |
| 1 | Ti | 75.0 | 13.0 | 12.0 | 0.92 | 1500 | Invention |
| 2 | Ti | 75.0 | 10.0 | 15.0 | 1.50 | 1500 | " |
| 3 | Ti | 73.0 | 6.0 | 21.0 | 3.50 | 1500 | " |
| 4 | Nb | 75.0 | 13.0 | 12.0 | 0.92 | 1500 | " |
| 5 | Nb | 75.0 | 10.0 | 15.0 | 1.50 | 1500 | " |
| 6 | Nb | 73.0 | 6.0 | 21.0 | 3.50 | 1500 | " |
| 7 | Ta | 75.0 | 13.0 | 12.0 | 0.92 | 1500 | " |
| 8 | Ta | 75.0 | 10.0 | 15.0 | 1.50 | 1500 | " |
| 9 | Cr | 75.0 | 13.0 | 12.0 | 0.92 | 1500 | " |
| 10 | Cr | 75.0 | 10.0 | 15.0 | 1.50 | 1500 | " |
| 11 | Mo | 90.0 | 8.0 | 2.0 | 0.25 | 1500 | " |
| 12 | Mo | 90.0 | 5.0 | 5.0 | 1.00 | 1500 | " |
| 13 | Mo | 75.0 | 24.0 | 1.0 | 0.04 | 1700 | " |

TABLE 1-continued

| Samples | Metal Added | Starting Composition (mol %) | | | Ratio Metal/SiC | Temperature (°C.) | Remarks |
|---|---|---|---|---|---|---|---|
| | | α-Al₂O₃ | SiC | Metal | | | |
| 14 | Mo | 75.0 | 13.0 | 12.0 | 0.92 | 1500 | " |
| 15 | Mo | 75.0 | 10.0 | 15.0 | 1.50 | 1500 | " |
| 16 | Mo | 73.0 | 6.0 | 21.0 | 3.50 | 1500 | " |
| 17 | Ti | 40.0 | 30.0 | 30.0 | 1.00 | 1600 | Comparison |
| 18 | Ti | 75.0 | 4.5 | 20.5 | 4.56 | 1500 | " |
| 19 | Nb | 40.0 | 30.0 | 30.0 | 1.00 | 1600 | " |
| 20 | Nb | 75.0 | 4.5 | 20.5 | 4.56 | 1500 | " |
| 21 | Ta | 75.0 | 4.5 | 20.5 | 4.56 | 1500 | " |
| 22 | Cr | 75.0 | 4.5 | 20.5 | 4.56 | 1500 | " |
| 23 | Mo | 40.0 | 30.0 | 30.0 | 1.00 | 1600 | " |
| 24 | Mo | 75.0 | 4.5 | 20.5 | 4.56 | 1500 | " |
| 25 | Mo | 96.7 | 3.0 | 0.3 | 0.10 | 1400 | " |
| 26 | — | 100.0 | — | — | — | 1300 | " |

Among the sintered samples, Samples 1, 4, 7, 9 and 14 according to the claimed invention were evaluated by X-ray diffraction method to identify the crystal phases.

The results are shown in Table 2.

TABLE 2

| Sample | Crystal Phases in Sintered Body |
|---|---|
| 1 | α-Al₂O₃, TiC, β-SiC |
| 4 | α-Al₂O₃, NbC, Nb₅Si₃, β-SiC |
| 7 | α-Al₂O₃, TaC, β-SiC |
| 9 | α-Al₂O₃, Cr₃C₂, β-SiC |
| 14 | α-Al₂O₃, Mo₂C, Mo₅Si₃, β-SiC |

As clearly seen from the Table 2, γ-Al₂O₃ in the starting material was completely converted to α-Al₂O₃. In each sintered body, a carbide of the metal added and silicon carbide were recognized. Further, in a part of the sintered body a silicide was found to be produced in addition to the carbides, wherein a glass phase was present along grain boundaries in the sintered body. According to a chemical analysis it was found that the glass phase contained silicon atoms.

A microstructure of each sintered body was observed with transmission electron microscopy and found that fine carbide particles having an average particle size of 0.5 μm or less were scattered, as well as α-Al₂O₃ particles having an average particle size of 2 μm or less, and β-SiC particles having an average particle size of about 0.1 μm.

Each sintered body was also evaluated in terms of a density, mechanical strength, fracture toughness and wear resistance.

The mechanical strength was evaluated by three-point bending test according to JIS R 1601, and the fracture toughness by IF method, JIS R 1607, under a load of 30 kg.f. In the fracture toughness test, a Vickers hardness was also measured.

The wear resistance was evaluated in a manner that a carbon steel ring having outside and inside diameters of 25 mm and 20 mm, respectively, was press-fitted on a surface of the sintered body disc under a load of 300 kg.f, which had a mirror-like-surface. The sintered body disc, thus prepared, was immersed into an oil bath and the disc was rotated at a rate of 500 r.p.m. for 5 hours.

Roughness of the disc surface before and after testing was measured and the difference between the before and after testing was evaluated as wear resistance in terms of maximum roughness height Rmax.

The results are shown in Table 3 below.

TABLE 3

| Sample | Density[*1] (g/cm³) | Strength (Mpa) | Fracture Toughness (Mpa · m^0.5) | Hardness HV30 | Surface Roughness[*2] (μm) | | | Remarks |
|---|---|---|---|---|---|---|---|---|
| | | | | | Before | After | Results | |
| 1 | 3.92 | 740 | 2.5 | 16.3 | 0.16 | 0.19 | ○ | Invention |
| 2 | 3.95 | 700 | 2.4 | 16.1 | 0.15 | 0.20 | ○ | " |
| 3 | 3.97 | 720 | 2.6 | 15.8 | 0.12 | 0.21 | ○ | " |
| 4 | 4.05 | 870 | 2.5 | 16.8 | 0.08 | 0.10 | ○ | " |
| 5 | 4.14 | 810 | 2.7 | 16.4 | 0.11 | 0.14 | ○ | " |
| 6 | 4.29 | 760 | 2.6 | 16.1 | 0.16 | 0.22 | ○ | " |
| 7 | 4.42 | 840 | 3.2 | 15.9 | 0.13 | 0.19 | ○ | " |
| 8 | 4.63 | 790 | 2.7 | 15.7 | 0.15 | 0.24 | ○ | " |
| 9 | 3.95 | 780 | 2.6 | 17.8 | 0.17 | 0.22 | ○ | " |
| 10 | 4.00 | 730 | 2.5 | 17.4 | 0.09 | 0.16 | ○ | " |
| 11 | 3.97 | 830 | 2.6 | 17.3 | 0.11 | 0.13 | ○ | " |
| 12 | 4.03 | 750 | 2.6 | 16.9 | 0.12 | 0.14 | ○ | " |
| 13 | 3.87 | 940 | 2.7 | 18.5 | 0.14 | 0.15 | ○ | " |
| 14 | 4.15 | 800 | 2.5 | 17.5 | 0.11 | 0.11 | ○ | " |
| 15 | 4.25 | 760 | 2.6 | 16.6 | 0.14 | 0.15 | ○ | " |
| 16 | 4.43 | 710 | 3.4 | 16.3 | 0.13 | 0.15 | ○ | " |
| 17 | 3.86 | 590 | 3.4 | 16.2 | 0.15 | 0.41 | Δ | Comparison |
| 18 | 3.96 | 630 | 2.6 | 15.7 | 0.18 | 0.63 | x | " |
| 19 | 4.45 | 620 | 3.3 | 16.5 | 0.16 | 0.34 | Δ | " |

TABLE 3-continued

| Sample | Density*[1] (g/cm³) | Strength (Mpa) | Fracture Toughness (Mpa · m^0.5) | Hardness HV30 | Surface Roughness*[2] (μm) Before | After | Results | Remarks |
|---|---|---|---|---|---|---|---|---|
| 20 | 4.21 | 670 | 2.5 | 16.0 | 0.20 | 0.69 | x | " |
| 21 | 4.84 | 650 | 2.6 | 15.6 | 0.19 | 0.92 | x | " |
| 22 | 4.03 | 620 | 2.5 | 17.0 | 0.13 | 0.74 | x | " |
| 23 | 4.70 | 640 | 3.3 | 17.4 | 0.11 | 0.26 | Δ | " |
| 24 | 4.37 | 660 | 2.6 | 16.1 | 0.16 | 0.58 | x | " |
| 25 | 3.95 | 720 | 2.4 | 17.9 | 0.19 | 0.84 | x | " |
| 26 | 3.95 | 640 | 2.3 | 17.0 | 0.24 | 1.40 | x | " |

Note *[1] Samples are sufficiently densified.
*[2] Results of the surface roughness are based on the following criteria.
o: Surface roughness after testing is double or less with respect to before testing
Δ: Surface roughness after testing is three times to double,
x: Surface roughness after testing is over three times.

As seen from the results of Table 3, the sintered body according to the present invention is sufficiently densified, shows strength of 700 Mpa or over and excellent wear resistance.

Whereas, the sintered body which is out of the scope of the claimed invention is inferior to those of the present invention, even though the sintered body is sufficiently densified.

Samples 17, 19 and 23, in which metal contents are over 25% and Samples 18, 20, 21, 22 and 24, in which silicon carbide contents are not more than 5% and metal/SiC ratios are 4 or more, and Sample 25, in which amounts of silicon carbide and a metal are not reached to the claimed amounts, are inferior in terms of the wear resistance.

EXAMPLE 2

α-Al$_2$O$_3$ powder having 99.99% or higher in purity, and an average particle size of 0.2 μm, β-SiC powder having an average particle size of 0.3 μm, and Mo powder having an average particle size of 0.65 μm were mixed in methanol as a solvent in a wet type ball mill in each amount stated in Table 4, and the mixture was molded under a cold isostatic hydraulic pressure (CIP).

The molded product was fired at a temperature stated in Table 4 in an ordinary argon gas atmosphere under an atmospheric pressure and further treated with a hot isostatic press (HIP) under an argon gas pressure of 2000 atm to form sintered body Samples 27 to 30.

TABLE 4

| Sample | Metal Added | Starting Composition (mol %) α-Al$_2$O$_3$ | SiC | Metal | Metal/SiC Ratio | Firing Temperature (°C.) | HIP Temp. (°C.) |
|---|---|---|---|---|---|---|---|
| 27 | Mo | 90.0 | 5.0 | 5.0 | 1.00 | 1600 | 1500 |
| 28 | Mo | 75.0 | 13.0 | 12.0 | 0.92 | 1800 | 1500 |
| 29 | Mo | 75.0 | 5.0 | 20.0 | 4.00 | 1700 | 1600 |
| 30 | Mo | 60.0 | 20.0 | 20.0 | 1.00 | 1900 | 1500 |

The sintered body obtained was evaluated in the same manner as of Example 1. The results are shown in Table 5.

The results of the sintered body show excellent properties at the same level as those of the Example 1, particularly at high wear resistance level.

TABLE 5

| Sample | Density (g/cm³) | Strength (MPa) | Fracture Toughness (Mpa · m^0.5) | Hardness HV30 |
|---|---|---|---|---|
| 27 | 4.10 | 740 | 2.6 | 1930 |
| 28 | 4.26 | 760 | 2.8 | 1950 |
| 29 | 4.52 | 730 | 2.7 | 1780 |
| 30 | 4.49 | 700 | 3.2 | 1800 |

While the invention has been described in detail and with reference to specific embodiments thereof, it will be apparent to one skilled in the art that various changes and modifications can be made therein without departing from the spirits and scope thereof.

What is claimed is:

1. A method for producing an aluminum oxide based sintered body which comprises firing a powder mixture comprising silicon carbide of from about 5 to about 40 mole %, at least one metal of from about 0.5 to about 25 mole %, selected from Ti, Nb, Ta, Cr and Mo, and the remainder of α-Al$_2$O$_3$ sources calculated as α-Al$_2$O$_3$ and having a molar ratio of the at least one metal with respect to the silicon carbide is about 4 or less, in a non-oxidizing atmosphere at a temperature of from about 1500° to about 1900° C.

2. A method for producing an aluminum oxide based sintered body which comprises firing a powder mixture comprising silicon carbide of from about 5 to about 40 mole %, at least one metal of from about 0.5 to about 25 mole %, selected from Ti, Nb, Ta, Cr, and Mo, and the remainder of α-Al$_2$O$_3$ sources calculated as α-Al$_2$O$_3$ and having a molar ratio of the at least one metal with respect to the silicon carbide is about 4 or less, in a non-oxidizing atmosphere at a temperature of from about 1500° to about 1900° C., and subjecting to a hot isostatic press.

* * * * *

UNITED STATES PATENT AND TRADEMARK OFFICE
CERTIFICATE OF CORRECTION

PATENT NO. : 5,527,746
DATED : June 18, 1996
INVENTOR(S) : JUN OTSUKA, et al

It is certified that error appears in the above-indentified patent and that said Letters Patent is hereby corrected as shown below:

In the title page, item [30] change "5-621921" to --5-261921--.

Signed and Sealed this

Tenth Day of December, 1996

Attest:

BRUCE LEHMAN

*Attesting Officer*  *Commissioner of Patents and Trademarks*